UNITED STATES PATENT OFFICE.

LOUIS HARPER, OF BROOKLYN, NEW YORK, ASSIGNOR TO WM. T. GIDDEN, OF BROOKLINE, MASSACHUSETTS.

IMPROVEMENT IN FERTILIZERS.

Specification forming part of Letters Patent No. 35,417, dated May 27, 1862.

*To all whom it may concern:*

Be it known that I, LOUIS HARPER, a citizen of the United States of America, and a resident of the city of Brooklyn, in the county of Kings and State of New York, have invented a new and useful mode of restoring phosphated guano; and I do hereby declare the same to be described as follows:

My invention comprehends the resuscitation and restoration of phosphatic guanos, such as come to us from the islands of the Pacific Ocean, the Gulf of Mexico, and other places. These islands are situated in zones subject to heavy atmospheric precipitations, most of them of periodical tropical rains, which lixiviate the guanos, as it were, and deprive them of all soluble parts, and leave only the basic phosphate of lime and magnesia and some insoluble organic matter. These guanos, although of great intrinsic value, are not such as fertilizers. They are insoluble in water, soluble only by a larger influence of the atmosphere and the different acids and alkalies in the soils, and affect vegetation only slightly and by degrees.

The object of my invention, now, is to resuscitate and restore these guanos to their original quality and effectiveness. I accomplish this by reimpregnating them with such ammoniacal and alkaline salts as are a material aid to the luxuriant growth of the herbaceous part of the plants, and rendering a part of the basic phosphates soluble by converting them by one and the same process into bi or superphosphates.

The reagents which I have selected for the above purpose are, first, all kinds of nitrogenous matter—such as carrion of any description, offal, (from slaughtered animals,) fish, blood, urine of any description, &c.—in a word, all kinds of nitrogenous matter yielding ammonia; second, acids, (mostly sulphuric acid;) third, the fixed alkalies, (soda and potash;) fourth, sulphates, (whose bases have less affinity for their acid than the nascent ammonia,) especially sulphate of lime. Ammoniacal salts may also be employed instead of nitrogenous matter; but as the power of the ammonia (contained in them) of combining further for the formation of double salts and promoting the solubility of the basic phosphates is very limited they are less desirable and useful than nitrogenous matter (of all kinds) yielding ammonia.

The chemical process to accomplish the above object which may be employed, and which I have hitherto employed, is the following:

First. I construct sheds with a wooden, cement, or stone floor and roofs.

Second. I then take a small portion of the guano to be acted upon, moisten it well with urine or animal juice, or, if neither can be had, with water, (sea-water is preferable,) but do not make it so wet that the moisture can run out. I mix it well and spread it over the floor of the shed, and spread over this layer a portion (about one-third or one-fourth) of the sulphate of lime to be used for the whole quantity of the guano upon which I may desire to operate.

Third. Upon the bed thus prepared I put the whole quantity of nitrogenous matter to be used for the determined quantity of guano, and spread it equally over the whole of it. It is best to take care that the pieces of the nitrogenous animal matter are not too large to accelerate decomposition. This layer of animal matter may remain exposed to the atmosphere until decomposition commences.

Fourth. Over the animal matter I spread another portion of the guano to be operated upon, previously moistened as above.

Fifth. Over this guano I spread the whole quantity of alkaline matter to be used for the guano operated upon, mixed with another half or third of the sulphate of lime, of which at least one-quarter must remain for purposes later to be stated.

Sixth. Over the layer of No. 5 I spread the remainder of the guano, which, if it be too dry, must previously be moistened a little, so as to obsorb liquids easier.

Seventh. As soon as the above is done I dilute a quantity of acid (best sulphuric acid sufficient to render a desired quantity of the basic phosphates of the guano soluble) with about four or five parts of water and pour it equally over the layer of guano No. 6. In this state the mass must remain for several days (with the admission of as much heat as possible, provided it does not exceed 200° Fahrenheit) under the immediate influence of the rays of the sun, if possible. After a few days the mass must be examined, and if it is not moist enough it must be moistened as above stated under No. 2. It has then again to remain for a few days, but continual care must be taken that the ammonia does not escape. If it should escape, a portion of the remaining sulphate of lime must be spread over the bed. If disintegration does not take place quick enough, the bed must be loosened and moistened, if necessary. As soon as the decomposition has proceeded far enough and is more than half accomplished the whole bed must be carefully turned in such a manner that the lower portion comes to the top, and the mass must be disintegrated, if necessary. This having been done, the balance of the sulphate of lime has to be equally spread over it. After about eight or ten days the careful turning may be repeated in order to accelerate decomposition. As soon as decomposition is completed the mass is to be dried, and for this purpose should be spread out and turned as often as possible. When dry it is ready for use.

The principles which are to guide the operator are the following:

First. The nature of the guano must not be changed.

Second. The quantity of lime in the same must not be increased, and no more lime ought to be added to it than is sufficient to give the increase of the guano about the same quantity of lime as the guano originally contained.

Third. The quantity of nitrogenous matter must be determined according to the quality of the guano. Care must be taken not to reduce the quantity of the phosphates too much. The phosphates ought not to be reduced below forty-five per cent. If the guano is such that this cannot be done, and that in order to obtain a sufficient quantity of ammonia the phosphates of the guano must be reduced below that standard, phosphates ought to be added by applying nitrogenous matter, which contains at the same time phosphates—for instance, fish, with their bones, &c.

Fourth. The quantity of the sulphuric acid must be determined according to the quantity of soluble sulphates desired. Not all the phosphates should be rendered soluble to promote the durability of the fertilizing quality of the guano. One-third or one-half is sufficient.

Fifth. The quantity of alkalies must be determined according to the quality of the guano and the reduction of the phosphates taken in consideration, as stated in principle No. 3.

Sixth. The quantity of the sulphate of lime must be determined as in principle No. 2.

I claim—

The restoration of phosphated guano in the manner and by the means substantially as described.

LOUIS HARPER.

Witnesses:
R. H. EDDY,
W. T. GLIDDEN.